United States Patent
Petricci et al.

(10) Patent No.: US 9,580,592 B2
(45) Date of Patent: Feb. 28, 2017

(54) LIQUID COMPOSITIONS OF FLUORINATED ANION EXCHANGE POLYMERS

(75) Inventors: Silvia Petricci, Bresso (IT); Pier Antonio Guarda, Arese (IT); Claudio Oldani, Nerviano (IT); Giuseppe Marchionni, Milan (IT)

(73) Assignee: SOLVAY SPECIALTY POLYMERS ITALY S.P.A., Bollate, Milan (IT)

(*) Notice: Subject to any disclaimer, the term of this patent is extended or adjusted under 35 U.S.C. 154(b) by 312 days.

(21) Appl. No.: 13/980,601

(22) PCT Filed: Jan. 18, 2012

(86) PCT No.: PCT/EP2012/050687
§ 371 (c)(1),
(2), (4) Date: Jul. 19, 2013

(87) PCT Pub. No.: WO2012/098146
PCT Pub. Date: Jul. 26, 2012

(65) Prior Publication Data
US 2013/0310246 A1    Nov. 21, 2013

(30) Foreign Application Priority Data

Jan. 21, 2011 (EP) ..................... 11151649
Jun. 16, 2011 (EP) ..................... 11170217

(51) Int. Cl.
| | | |
|---|---|---|
| C08L 29/10 | (2006.01) |
| B01J 31/08 | (2006.01) |
| C08F 8/44 | (2006.01) |
| C09D 127/12 | (2006.01) |
| C08J 5/20 | (2006.01) |
| C08J 5/22 | (2006.01) |

(52) U.S. Cl.
CPC ............. *C08L 29/10* (2013.01); *B01J 31/08* (2013.01); *C08F 8/44* (2013.01); *C08J 5/20* (2013.01); *C08J 5/225* (2013.01); *C08J 5/2237* (2013.01); *C09D 127/12* (2013.01); *C08J 2327/12* (2013.01)

(58) Field of Classification Search
USPC ........................................... 502/159; 521/28
See application file for complete search history.

(56) References Cited

FOREIGN PATENT DOCUMENTS

| EP | 079218 A1 | * | 11/1981 |
|---|---|---|---|
| EP | 0079218 A1 | | 5/1983 |
| EP | 0166015 A1 | | 1/1986 |
| EP | 166015 A1 | * | 1/1986 |
| EP | 1612874 A1 | * | 1/2006 |
| JP | 57-182345 A | * | 11/1982 |
| JP | 57-182346 A | | 11/1982 |
| JP | 62-161866 A | * | 7/1987 |
| JP | 62-161867 A | * | 7/1987 |
| JP | 64-4627 A | | 1/1989 |
| JP | 1-297433 A | | 11/1989 |
| JP | 1-311132 A | | 12/1989 |
| JP | 2001-081261 A | * | 3/2001 |
| JP | 2001-81261 A | | 3/2001 |
| JP | 2003-081261 A | * | 3/2001 |

* cited by examiner

*Primary Examiner* — Peter D Mulcahy
*Assistant Examiner* — Henry Hu

(57) ABSTRACT

A liquid composition comprising:
a liquid medium comprising at least one aprotic polar organic solvent and less than 25 wt % based on the total weight of the composition of an alcohol; and
at least 5 wt % based on the total weight of the composition of at least one fluorinated anion exchange polymer comprising a fluorocarbon backbone and side-chains covalently attached to the backbone having terminal groups of formula (I): $-SO_2NR^1Q^+X^-$, wherein $Q^+$ is a group comprising at least one quaternary nitrogen atom, and $R^1$ is H or a $C_1$-$C_{20}$ alkyl group, or forms a ring together with a group in $Q^+$, wherein the ring contains 2 to 10 carbon atoms and, optionally, up to 4 heteroatoms; and $X^-$ is an anion selected among the group consisting of organic anions and lipophilic inorganic anions is disclosed. The liquid composition is suitable for the preparation of ion exchange membranes and as binders for electrocatalytic layers for use in electrochemical applications.

10 Claims, No Drawings

LIQUID COMPOSITIONS OF FLUORINATED ANION EXCHANGE POLYMERS

CROSS-REFERENCE TO RELATED APPLICATIONS

This application is a U.S. national stage entry under 35 U.S.C. §371 of International Application No. PCT/EP2012/050687 filed Jan. 18, 2012, which claims priority to European application No. 11151649.8 filed on Jan. 21, 2011 and to European application No. 11170217.1 filed on Jun. 16, 2011, the whole content of each of these applications being incorporated herein by reference for all purposes.

TECHNICAL FIELD

The invention relates to fluorinated anion exchange polymer liquid compositions, to a process for manufacturing said liquid compositions and to their use for the manufacture of articles such as ion exchange membranes.

BACKGROUND ART

Anion exchange polymers comprising a perfluorinated backbone and pendant chains covalently bonded to the perfluorinated backbone comprising quaternary ammonium groups are known in the prior art.

EP 166015 A (TOYO SODA MANUFACTURING INC) Jan. 2, 1986 discloses ion exchange membranes comprising a fluorocarbon anion exchange polymer. The polymer is composed of a fluorocarbon polymer comprising a perfluorocarbon main chain and a pendant chain attached to the main chain, having a terminal group represented by the formula: $-SO_2N(R^4)-(CH_2)_a-NR^1R^2R^3Z$, where $R^1$ is a lower alkyl group, an aromatic group or an alkyl group containing quaternary ammonium group(s), $R^2$ is a lower alkyl group, an aromatic group or a hydroxy-lower alkyl group, or $R^1$ and $R^2$ together form a tetramethylene or pentamethylene group, $R^3$ is a lower alkyl group, $R^4$ is a hydrogen atom, a lower alkyl group or an alkyl group containing quaternary ammonium group(s), a is an integer of 2 to 5, and Z is a counter ion for the quaternary ammonium ion. The membranes are obtained by reacting a fluorocarbon polymer comprising fluorosulfonyl terminal groups with an amine of formula $HNR^4-(CH_2)_a-NR^1R^2$, where $R^1$, $R^2$, $R^4$ and a are as defined above, followed by reaction with an alkylating agent to convert the tertiary amino group into a quaternary ammonium group.

EP 1612874 A (SOLVAY SA) Jan. 4, 2006 discloses anion exchange membranes comprising a support polymer and groups of formula $-SO_2NR^1Q^+$ covalently bonded to the support polymer, wherein $Q^+$ is a group comprising at least one quaternary nitrogen atom, and $R^1$ is H or a $C_1$-$C_{20}$ alkyl group, or forms a ring together with a group in $Q^+$, wherein the ring contains 2 to 10 carbon atoms and, optionally, up to 4 heteroatoms. The support polymer is in the form of a film. Examples of support polymers include fluorinated and perfluorinated polymers as well as non-fluorinated polymers. The membranes are obtained by reaction of a suitable amine with a support polymer comprising sulfonyl groups.

Liquid dispersions of fluorinated anion exchange polymers in organic solvents have been disclosed in JP 62-161866 A (TOYO SODA MANUFACTURING LTD) Jul. 17, 1987, which discloses liquid compositions comprising a mixed solvent comprising at least one solvent selected from dimethylformamide, dimethylsulfoxide, hexamethylphosphoric acid triamide and 1,3-dimethyl-2-imidazolidinone and 20 to 90 wt % of isopropanol and a fluorinated anion exchange polymer comprising a quaternary ammonium salt including the following:

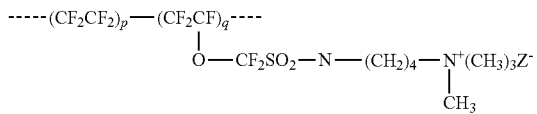

wherein Z is selected from halogen, $BF_4$, $SbCl_6$, $RSO_3$, RCOO, R being a lower alkyl or fluoroalkyl or a non-substituted phenyl group. The composition disclosed in the examples however contains low amounts of the fluorinated anion exchange polymer (2.7 wt %).

JP 62-161867 A (TOYO SODA MANUFACTURING LTD) Jul. 17, 1987 similarly discloses liquid compositions comprising the fluorinated anion exchange polymer comprising a quaternary ammonium salt described in JP 62-161866 and a three-component mixed solvent comprising at least one solvent selected from methanol and ethanol, isopropanol and water. No information is given concerning the concentration of the fluorinated anion exchange polymer achievable in the three-component liquid composition.

JP 2001-081261 A (ASAHI GLASS LTD) Mar. 27, 2001 discloses the preparation of fluorinated anion exchange polymers having quaternary ammonium ion exchange groups by reaction of a fluorinated polymer having $-SO_2F$ or $-SO_2Cl$ end groups with a diamine followed by reaction with e.g. an alkyl halide. Compositions comprising the anion exchange polymers in fluorinated alcohols (for instance hexafluoro 2-propanol) are described as well as their use for preparing ion exchange membranes. Concentrations of the anion exchange polymers in the fluorinated alcohol of about 2 wt % are disclosed in the examples From the foregoing it appears that the need still exists for liquid compositions of fluorinated anion exchange polymers having quaternary ammonium ion exchange groups containing higher amounts of the polymer. However, it has now been found that in order to obtain a liquid composition containing at least 5 wt % of a fluorinated polymer having quaternary ammonium ion exchange groups liquid media comprising less than 25 wt % of an alcohol should be used. Liquid compositions containing at least 5 wt % of the anion exchange fluorinated polymer are particularly suitable for preparing films or membranes by casting, as lower concentrations of the polymer generally lead to the formation of thin films which lack the desired mechanical resistance for most applications.

Thus, a need still exists for liquid compositions comprising a fluorinated anion exchange polymer having an appropriate concentration of the fluorinated anion exchange polymer to be suitably employed for the preparation of films, membranes and electrode layers by casting or coating techniques.

DESCRIPTION OF INVENTION

A first object of the invention is therefore a liquid composition comprising:
- a liquid medium comprising at least one aprotic polar organic solvent and less than 25 wt % based on the total weight of the composition of an alcohol;
- at least 5 wt % based on the total weight of the composition of at least one fluorinated anion exchange polymer (P) comprising a fluorocarbon backbone and side-chains covalently attached to the backbone having terminal groups of formula (I): —$SO_2NR^1Q^+X^-$, wherein $Q^+$ is a group comprising at least one quaternary nitrogen atom, and $R^1$ is H or a $C_1$-$C_{20}$ alkyl group, or forms a ring together with a group in $Q^+$, wherein the ring contains 2 to 10 carbon atoms and, optionally, up to 4 heteroatoms; and $X^-$ is an anion selected from the group consisting of organic anions and lipophilic inorganic anions.

Suitable organic anions $X^-$ may be selected from the group consisting of $R_{A1}SO_3^-$, wherein $R_{A1}$ is a $C_1$-$C_{20}$ linear or branched, optionally fluorinated, alkyl or a substituted or non-substituted aryl group, and of $R_{A2}COO^-$, wherein $R_{A2}$ is a $C_1$-$C_{20}$ linear or branched, optionally fluorinated, alkyl or a substituted or non-substituted aryl group.

When $X^-=R_{A1}SO_3^-$, $R_{A1}$ is preferably selected from the group of the substituted or non-substituted aryl groups. More preferably $R_{A1}$ is p-$(CH_3)$ $C_6H_4^-$ (tosylate anion).

When $X^-=R_{A2}COO^-$, $R_{A2}$ is preferably selected from $C_1$-$C_{12}$, more preferably $C_1$-$C_6$, linear or branched fluorinated alkyl groups.

The Hofmeister series is conventionally taken as a measure of the lipophilic affinity of inorganic anions. A non-exhaustive version of the Hofmeister series is: $CO_3^{2-}$ <$SO_4^{2-}$<$S_2O_3^{2-}$<$H_2PO_4^-$<$F^-$<$Cl^-$<$Br^-$<$NO_3^-$<$I^-$<$ClO_4^-$ <$SCN^-$ (from the less to the most lipophilic). For the purpose of the present invention the term "lipophilic inorganic anion" is used to refer to inorganic anions which are to the right of $Cl^-$, preferably to the right of $Br^-$, in a Hofmeister series of anions. Notable examples of lipophilic inorganic anions are $I^-$, $ClO_4^-$, $SCN^-$, $NO_3^-$. Preferably $X^-$ is selected from $I^-$ or $NO_3^-$. More preferably $X^-$ is $NO_3^-$.

In an embodiment of the present invention $X^-$ is selected from the group consisting of $NO_3^-$ and $R_{A1}SO_3^-$ wherein $R_{A1}$ is selected from the group of the substituted or non-substituted aryl groups, preferably $R_{A1}$ is p-$(CH_3)C_6H_4^-$.

The fluorinated anion exchange polymer (P) comprises a fluorocarbon backbone and side-chains covalently attached to the backbone having terminal groups of formula (I): —$SO_2NR^1Q^+X^-$, wherein Q, $R^1$ and $X^-$ are as defined above.

The fluorinated backbone in the fluorinated anion exchange polymer is a linear random polymer chain comprising repeating units represented by the formula (II):

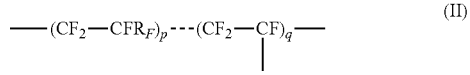

wherein $R_F$ is F, Cl, —$CF_3$, preferably F.

In formula (II) p is an integer of 0 to 16, q is an integer of 1 to 10 and the ratio of p'/q' is in the range 0.5 to 16 where p' is an average value of all p in the repeating units and q' is an average value of all p in the repeating units.

Typically the fluorinated anion exchange polymer comprises repeating units represented by the formula (III):

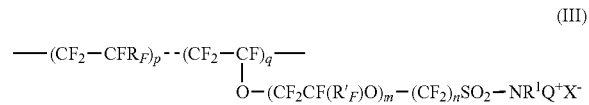

wherein the side-chains having terminal groups of formula (I) are covalently attached to the backbone by means of groups of formula —[O—$(CF_2CF(R_F)O)_m$—$(CF_2)_n$]—.

In formula (III) $R'_F$ is selected from F, Cl, —$CF_3$; preferably from F or —$CF_3$; m is an integer equal to 0 or 1, n is an integer from 0 to 10; $R^1$, $Q^+$ and $X^-$ are as defined above. When m equals 1, n is an integer from 0 to 10, preferably from 0 to 6. Preferably, when m equals 1, n equals 2. When m is 0, n is an integer from 0 to 10, preferably from 2 to 6, more preferably from 2 to 4. More preferably when m is 0 n is 2.

The fluorinated anion exchange polymer may advantageously be prepared by a process comprising the reaction of a fluorinated polymer comprising side-chains having sulfonyl fluoride terminal groups with an amine to obtain sulfonamide terminal groups, followed by reaction with an alkylating agent to obtain the quaternary ammonium ion exchange group.

The amine may be represented by general formula $HNR^1Q^1$ wherein $R^1$ is as defined above and $Q^1$ is a group comprising a tertiary amino group precursor of the quaternary ammonium group $Q^+$.

Reaction of the fluorinated precursor polymer comprising side-chains having sulfonyl fluoride terminal groups with an amine of formula $HNR^1Q^1$ is generally carried out by dispersing the fluorinated polymer in an organic solvent in which the amine is soluble. The fluorinated polymer used for the preparation of the dispersion is preferably in the form of a powder.

Notable examples of suitable solvents are acetonitrile, N,N-dimethylformamide, fluorinated aliphatic and aromatic compounds, e.g. perfluorohexane, perfluorooctane, hexafluorobenzene, hydrofluoroethers such as those of formula $C_3F_7OCH_3$, $C_4F_9OCH_3$, $C_4F_9OC_2H_5$, $C_7F_{15}OC_2H_5$, hydrofluoropolyethers such as those available from Solvay Solexis S.p.A. under the tradenames H-GALDEN® ZT 60, H-GALDEN® ZT 85, H-GALDEN® ZT 100, H-GALDEN® ZT 130, H-GALDEN® ZT 150, H-GALDEN® ZT 180.

A slight excess of the amine is typically added in a step-wise manner to the dispersion of the polymer at temperatures in the range from −40 to 70° C., preferably between −20 and 30° C. Optionally, the reaction may be carried out in the presence of a non-nucleophile organic base e.g. a tertiary amine.

The fluorinated polymer comprising side-chains having sulfonamide terminal groups thus obtained is generally recovered by filtration from the solvent and washed before reaction with an alkylating agent to obtain the quaternary ammonium ion exchange group. Alkylating agents known in the art may be used for the reaction. Preferred alkylating agents are methyl iodide and methyl tosylate. Fluorinated anion exchange polymers having an anion $X^-$ different from iodine or tosylate may be conveniently prepared by anion exchange.

Suitable solvents for the alkylation reaction are for instance acetonitrile, methanol, N,N-dimethylformamide and their mixtures. The reaction is typically carried out at temperatures from 0 and 150° C., preferably from 20 and 80° C.

Fluorinated polymers comprising side-chains having sulfonyl fluoride terminal groups suitable for the preparation of the anion exchange polymer are copolymers comprising recurring units derived from a fluoroolefin of formula $CF_2=CFR_F$, wherein $R_F$ is selected from F, Cl, —$CF_3$, and recurring units derived from at least one functional monomer of formula $CF_2=CF-O-(CF_2CF(R'_F)O)_m-(CF_2)_n SO_2F$, wherein m is an integer equal to 0 or 1, n is an integer from 0 to 10. The fluoroolefin is preferably tetrafluoroethylene.

Examples of fluorinated polymers comprising side-chains having sulfonyl fluoride terminal groups are for instance those sold by Solvay Solexis SpA under the trade name Aquivion® PFSA or those available from Du Pont under the trade name Nafion®.

In an embodiment of the invention the group of formula (I) has the following structure:

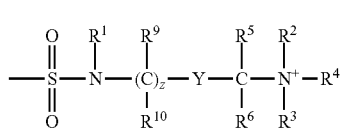

(IV)

wherein Y is a $C_6$-$C_{10}$ aryl group, a heteroaryl group or $CR^7R^8$ wherein $R^7$ is H, a halogen atom or a $C_1$-$C_{20}$ alkyl group or forms a ring together with one of $R^2$, $R^5$, or $R^8$, and $R^8$ is H, a halogen atom or a $C_1$-$C_{20}$ alkyl group or forms a ring together with one of $R^3$, $R^6$, or $R^7$, each of the rings formed by $R^7$ or $R^8$ containing 2 to 10 carbon atoms and optionally 1 to 4 heteroatoms, and the heteroaryl group contains 5 to 10 ring atoms; $R^1$ is H or a $C_1$-$C_{20}$ alkyl group, or forms a ring together with one of $R^2$ or $R^5$, wherein the ring contains 2 to 10 carbon atoms and 1 to 4 heteroatoms; $R^2$ is a $C_1$-$C_{20}$ alkyl group or forms a ring together with one of $R^1$, $R^3$, $R^5$, $R^7$ or $R^9$, wherein the ring contains 2 to 10 carbon atoms and 1 to 4 heteroatoms, e.g. nitrogen atoms; $R^3$ is a $C_1$-$C_{20}$ alkyl group or forms a ring together with one of $R^2$, $R^6$, $R^8$ or $R^{10}$, wherein the ring contains 2 to 10 carbon atoms and 1 to 4 heteroatoms; $R^4$ is a $C_1$-$C_{20}$ alkyl group; $R^5$ is H, a halogen atom or a $C_1$-$C_{20}$ alkyl group, or forms a ring together with one of $R^1$, $R^2$, $R^7$ or $R^9$, wherein the ring contains 2 to 10 carbon atoms and optionally 1 to 4 heteroatoms; $R^6$ is H, a halogen atom or a $C_1$-$C_{20}$ alkyl group, or forms a ring together with one of $R^3$, $R^8$ or $R^{10}$, wherein the ring contains 2 to 10 carbon atoms and optionally 1 to 4 heteroatoms; each $R^9$ is independently H, a halogen atom or a $C_1$-$C_{20}$ alkyl group, or forms a ring together with one of $R^2$ or $R^5$, wherein the ring contains 2 to 10 carbon atoms and optionally 1 to 4 heteroatoms; each $R^{10}$ is independently H, a halogen atom or a $C_1$-$C_{20}$ alkyl group, or forms a ring together with one of $R^3$ or $R^6$, wherein the ring contains 2 to 10 carbon atoms and optionally 1 to 4 heteroatoms; z is an integer from 0 to 4; and wherein the ring structures in the group of formula (IV) can be bridged by $C_1$-$C_4$ alkylene groups.

Suitable amines for the preparation of fluorinated anion exchange polymers having side-chains comprising terminal groups of formula (IV) are represented by formula (V):

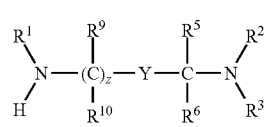

(V)

wherein $R^1$, $R^2$, $R^3$, $R^5$, $R^6$, $R^9$, $R^{10}$, Y, z are as defined above.

Notable examples of amines according to formula (V) are selected from the following classes:
- α-(dimethylamino)-β,β-dialkyl-ω-aminoalkyls, for example N,N,2,2-tetramethyl-1,3-propanediamine;
- N-(ω-aminoalkyl)imidazoles;
- 2-alkyl-4-ω-aminoalkyl-N,N-dimethylaminobenzyls and 2,6-dialkyl-4-amino-N,N-dimethylaminobenzyls, for example 2,6-dimethyl-4-amino-N,N-dimethylbenzylamine;
- 1-methylpiperazines, mono- and/or disubstituted by alkyl groups in position 2 and/or 6, for example 1,2,6-trimethylpiperazine;
- 1-(ω-aminoalkyl)piperazines, mono- and/or disubstituted by alkyl groups in position 2 and/or 6;
- "bridged aminopiperazine";
- 1-methyl-4(ω-aminoalkyl)-3,5-alkyl(mono, di) piperidines;
- 1-methyl (or H)-2,6 alkyl(mono, di, tri or tetra)-4-aminopiperidines;
- "bridged aminopiperidine";
- 1-methyl-3-aminopyrrolidines, optionally alkyl substituted in 2- and/or 5-position, for example 3-amino-1-methylpyrrolidine;
- 4-(ω-aminoalkyl)morpholine, alkyl substituted in position 3 and/or 5, for example 4-(2-aminoethyl) 2,6 dimethyl morpholine;
- "aza-aminoadamantanes".

Preferably the amine is N,N,2,2-tetramethyl-1,3-propanediamine. Accordingly in formula (IV) $R^1$=H, $R^2$=$R^3$=$CH_3$, $R^5$=$R^6$=$R^9$=$R^{10}$=H, z=1 and Y=$CR^8R^9$, wherein $R^8$=$R^9$=$CH_3$.

The liquid composition contains the fluorinated anion exchange polymer (P) in an amount of at least 5 wt %, with respect to the total weight of the liquid composition. Typically, the amount of fluorinated anion exchange polymer (P) in the liquid composition is at least 6 wt %, preferably at least 8 wt %, more preferably at least 10 wt %, even more preferably at least 12 wt % with respect to the total weight of the liquid composition. The amount of fluorinated anion exchange polymer (P) in the liquid composition generally does not exceed 60 wt %, preferably it does not exceed 50 wt %, more preferably it does not exceed 45 wt % with respect to the total weight of the liquid composition. When the amount of the fluorinated anion exchange polymer (P) in the composition exceeds 60 wt % the viscosity of the composition is generally too high to prepare membranes e.g. by means of a casting, coating or impregnation process. On the other hand, if the amount of the fluorinated anion exchange polymer (P) in the composition is less than 5 wt % the amount of polymer deposited on a given substrate is generally too low to provide a continuous membrane of uniform thickness. In such a case a high number of sequential deposition steps, for instance by coating, casting or impregnation, may be required to obtain a membrane of the desired thickness.

The liquid composition generally comprises the fluorinated anion exchange polymer (P) under dissolved or dispersed form. The term "dissolved form" is intended to denote a "true" solution of the fluorinated anion exchange polymer (P). The wording "dispersed form" is hereby intended to denote a colloidal suspension of the fluorinated anion exchange polymer (P), whereby particles of fluorinated anion exchange polymer of average particle size of generally less than 500 nm are stably suspended with no settlement phenomena when left in unperturbed state.

In addition to the fluorinated anion exchange polymer (P) the liquid composition further comprises an aprotic polar organic solvent. The expression "aprotic organic solvent" is intended to denote an organic solvent which does not comprise acidic hydrogen atoms. In the remainder of the text the expression is understood, for the purposes of the present invention, both in the singular and the plural, in that more than one aprotic organic solvent can be used at any one time.

Typically, suitable aprotic polar organic solvents are characterized by having a boiling temperature of 150° C. or more, preferably of 160° C. or more.

The aprotic polar organic solvent is selected from the group consisting of aliphatic and cycloaliphatic amides and aliphatic sulphoxides. Preferably the aprotic polar organic solvent is selected from the group consisting of N,N-dimethylformamide, N,N-dimethylacetamide, N-methylpyrrolidone, N-ethylpyrrolidone, dimethylsulphoxide. More preferably the aprotic polar organic solvent is selected from the group consisting of N,N-dimethylformamide, N,N-dimethylacetamide, N-methylpyrrolidone, N-ethylpyrrolidone.

The liquid composition may optionally comprise minor amounts of a protic solvent. Typical protic solvents are selected from the group consisting of water and alcohols, typically $C_1$-$C_6$ alcohols, such as methanol, ethanol, isopropanol.

When the protic solvent is an alcohol, in particular a $C_1$-$C_6$ alcohol, it is present in the liquid composition in amounts of less than 25 wt % with respect to the total weight of the liquid composition. Higher amounts of alcohols, in particular $C_1$-$C_6$ alcohols, have been found to reduce the amount of fluorinated anion exchange polymer (P) which can be dissolved or dispersed in the liquid composition to less than 5 wt %. The amount of alcohol present in the liquid composition is advantageously less than 20 wt %, even less than 15 wt % with respect to the total weight of the liquid composition.

The liquid composition may optionally comprise additional ingredients. Mention can be made of non-ionic surfactants like TRITON® surfactant, TERGITOL® surfactant; as well as thermoplastic fluoropolymers, typically having film-forming properties. Among thermoplastic fluoropolymers which can be used in combination with the fluorinated anion exchange polymer in the liquid composition, mention can be made of PFA, ETFE, PCTFE, PDVF, ECTFE, and the like.

The liquid composition of the invention is prepared by a dissolution process comprising the steps of: providing the fluorinated anion exchange polymer (P) as detailed above; and contacting said polymer with a liquid medium comprising at least one aprotic polar organic solvent and less than 25 wt % of an alcohol with respect to the total weight of the liquid composition.

The process is carried out under stirring at a temperature of at least 20° C., typically of at least 50° C., preferably of at least 60° C., more preferably of at least 70° C. The temperature does not typically exceed 200° C., preferably it does not exceed 180° C., even more preferably it does not exceed 160° C.

The process is advantageously carried out at atmospheric pressure, without the need to employ pressurized vessels.

The liquid compositions thus obtained can be used for the preparation of articles such as ion exchange membranes, films, battery separators, or as binders for electrocatalytic layers.

The invention further relates to a process for the preparation of ion exchange membranes using the liquid composition as above detailed.

The process typically comprises the step of applying the liquid composition comprising fluorinated anion exchange polymer (P) onto a substrate.

Any conventional method known in the art, such as impregnation, casting, coating, e.g. roller coating, gravure coating, reverse roll coating, dip coating, spray coating and the like may be used to carry out this step.

The liquid composition may be cast over an inert, non porous, support in a film-forming layer which, usually after a drying step, is removed from the support providing an article, typically in the form of a film, comprising the fluorinated anion exchange polymer (P). Common supports are for instance a plate, a belt or a fabric, made of glass, metal or polymeric material from which the film of the fluorinated anion exchange polymer (P) may be removed.

Alternatively, the process may be used for the preparation of composite articles, that is articles comprising a support, preferably a porous support, in addition to fluorinated anion exchange polymer (P). Composite articles, comprising a reinforcing support, preferably a porous support, in addition to the fluorinated anion exchange polymer (P), are typically prepared using the liquid composition as above detailed with an impregnation process.

Such an impregnation process comprises the step of impregnating a porous support with the liquid composition of the invention.

The choice of the porous support is not particularly limited. Porous supports which are generally inert under the final operating conditions of the composite membranes will be selected.

Among porous inert materials capable to provide the composite membranes with suitable mechanical properties mention can be made of woven or non-woven polyolefin membranes, in particular polyethylene membranes, and fluoropolymer porous supports. Porous supports of fluoropolymers are generally preferred because of their high chemical inertia.

Biaxially expanded PTFE porous supports (otherwise known as ePTFE membranes) are among preferred supports. These support are notably commercially available under trade names GORE-TEX®, TETRATEX®.

The process, be it a casting, coating or impregnation process, typically comprises at least one drying step and optionally at least one annealing step.

The drying step is generally carried out at a temperature of 20 to 100° C., preferably from 25 to 90° C., more preferably from 30 to 80° C. A flow of air or of inert gas (e.g. nitrogen) is generally contacted with the impregnated support during this step.

The process may optionally comprise an annealing step. The annealing step typically comprises heat treating the article comprising the fluorinated anion exchange polymer (P) at a temperature of at least 120° C., preferably of at least 150° C., more preferably of at least 180° C. Maximum temperature of the annealing step is not particularly limited, provided that the support (when present) and the fluorinated anion exchange polymer (P) remain stable under these conditions. It is thus generally understood that the annealing step is carried out at a temperature not exceeding 270° C., preferably not exceeding 250° C., more preferably not exceeding 220° C.

It has been observed that an annealing step has the effect of consolidating the film, membrane or impregnated structure of the fluorinated anion exchange polymer (P). The mechanical properties of the annealed article have been found to be better than the mechanical properties of non-annealed articles having the same composition.

The Applicant has surprisingly found that the annealing step can be advantageously carried out without degradation of the fluorinated anion exchange polymer (P) in particular when $X^-$ is an anion selected from the group consisting of $NO_3^-$ and $R_{A1}SO_3^-$ wherein $R_{A1}$ is selected from the group of substituted or non-substituted aryl groups, preferably p-$(CH_3)C_6H_4SO_3^-$. The articles obtained after the annealing step (e.g. films, composite membranes) are generally provided with improved mechanical properties.

Additional steps, including for instance, rinsing steps for removal of organic pollutants, can be present in the process.

When the article is an ion exchange membrane it is advantageously converted into in the $OH^-$ form, e.g. the form suitable for ion exchange, by conditioning the membrane in an aqueous or hydro-alcoholic alkali solution, e.g. an aqueous solution of NaOH or KOH.

The ion exchange membranes comprising fluorinated anion exchange polymer (P), in particular composite membranes, are useful as membranes in fuel cell applications or metal ion battery applications, e.g. lithium air batteries.

In addition to the use for the preparation of ion exchange membranes the liquid composition of the invention may be advantageously employed also for the preparation of so-called "catalytic inks" which are used to build up electrode layers onto the surface of an ion conducting membrane for use in an electrochemical fuel cell. Such catalytic inks, in addition to the liquid composition comprising the fluorinated anion exchange polymer (P) as described above, comprise catalyst particles. Typical catalyst particles comprise an active compound selected among metals like iron, manganese, cobalt, nickel, platinum, ruthenium, gold, palladium, rhodium, iridium; their electro conductive oxides and alloys. The active compound is generally supported on a suitable material, herein called "carrier", which is preferably electrically conductive. The carrier is advantageously chosen from carbon powder, for instance carbon black.

The amount of catalyst particles (including the carrier, if any) in the catalytic ink is generally of at least 1 wt % based on the total weight of the catalytic ink. Preferably, it is of at least 3 wt % and more preferably of at least 5 wt %. The amount of catalyst particles (including the carrier, if any) in the catalytic ink is advantageously of at most 50 wt % based on the total weight of the catalytic ink, preferably of at most 40 wt % and more preferably of at most 30 wt %.

Catalyst inks comprising the liquid composition of the invention can be used for the preparation of electrocatalytic layers. The electrocatalytic layers may for instance be prepared by screen printing or solution coating the catalyst ink on the surface of an ion exchange membrane. The ion exchange membrane may comprise the fluorinated anion exchange polymer (P) as detailed above, having the same or different molar composition, or it may comprise a different ion exchange polymer.

Thus, an additional object of the present invention is an assembly comprising an ion exchange membrane having first and second surface, a first electrocatalytic layer adhered to said first surface and a second electrocatalytic layer adhered to said second surface, wherein at least one of said first or second electrocatalytic layers comprises a fluorinated anion exchange polymer (P) as defined above.

The invention will be now described in more detail with reference to the following examples, whose purpose is merely illustrative and not intended to limit the scope of the invention.

Should the disclosure of any patents, patent applications, and publications which are incorporated herein by reference conflict with the description of the present application to the extent that it may render a term unclear, the present description shall take precedence.

EXAMPLES

Materials
Aquivion® PFSA (Solvay Solexis SpA) precursor (with pendant groups in the —$SO_2F$ form, EW=781): powder dried in an oven at 70° C. under vacuum for 12 h (water content<900 ppm measured by the Karl-Fischer method);
Novec® 7500, $CH_3OC_7F_{15}$ (3M): dried on molecular sieves having 3 porosity;
N,N,2,2-tetramethyl-1,3-propanediammine (Sigma-Aldrich): dried on KOH;
Acetonitrile (Sigma-Aldrich): dried on molecular sieves (3 Angstrom porosity).
All remaining reagents (supplied by Sigma-Aldrich) were used as received.

Analytical Methods

Method 1: Acidimetry and Alkalimetry by Potentiometric Titration (Acidic and Basic Titer of the Polymer)

To a weighed amount of polymer (about 0.3 g) in a 100 ml flask, 50 ml of isopropyl alcohol and 8.0 ml of 0.1 N aqueous HCl are added. The mixture is stirred at room temperature for 4 hours and then distilled water is added to reach the 100 ml volume. 50 ml of the clear solution are taken, added with 20 ml of distilled water and the excess acid is titrated with NaOH 0.1 N using a potentiometer. The basic titer of the polymer corresponds to the consumed HCl, related to the amount of initial polymer.

Following a similar procedure the acidic titer was determined: 8.0 ml of 0.1 N NaOH are initially added to a weighed amount of polymer and the excess base is titrated with 0.1 N HCl.

Method 2: Determination of Iodides by Potentiometric Titration

A weighed amount of polymer (about 0.3 g) is put is a beaker containing 25 ml of distilled water and 25 ml of methanol. 10 ml of aqueous 0.1 N $AgNO_3$ and a few drops of concentrated $HNO_3$ are added to the mixture. Excess Ag is titrated with 0.1 N HCl using a potentiometer equipped with an electrode for argentometry. The consumed silver, related to the amount of polymer, corresponds to the iodide titer of the polymer. This method can be used also to determinate the chloride titer of the polymer.

Method 3: Determination of the Content of Hydroxide Anions in the Polymer

A weighed amount of polymer (about 0.3 g), is put in a solution of NaCl 0.6M free from $CO_2$ (120 g). After 24 hours at room temperature a part of solution is taken and titrated with HCl 0.1 N in order to quantify the amount of hydroxide anions originally present in the polymer and displaced by anion exchange reaction with chloride.

Example 1

Preparation of the Fluorinated Anion Exchange Polymer (P)

Example 1a

Amidation Reaction 10 g of Aquivion® PFSA precursor were put in a round bottom flask containing 200 g of Novec® 7500 equipped with a mechanical stirrer, a dropping funnel, a gas inlet for nitrogen and a gas outlet. A flow of nitrogen (about 2 liter/hours) was applied during the reaction. The polymer dispersion was stirred at room temperature for about 2 hours. The flask was then cooled at −20° C. by means of an external cooling bath, and 14 g of N,N,2,2-tetramethyl-1,3-propanediamine were slowly added under stirring through the dropping funnel (in about 30 minutes). The mixture was stirred at −20° C. for additional 8 hours. The polymer was filtered, washed with 100 g of Novec® 7500 for 1 hour under stirring, and then treated twice with 100 g of 5% KOH solution under stirring for 1 hour. Finally the polymer was washed twice with 100 g ethanol and dried in an oven at 70° C. under vacuum for 4 hours. 9.4 g of dried polymer were obtained.

The basic titer of the polymer (Method 1) was 1.78 meq/g.

The analytical results confirmed structure (VI) for the polymer, having a concentration of functionalized pendant sulphonamide groups of 0.9 meq/g and a calculated molar ratio p/q of 6.4.

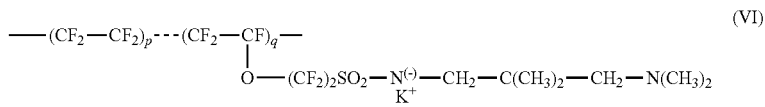

(VI)

Example 1b

Alkylation Reaction with CH$_3$I—Preparation of the Fluorinated Anion Exchange Polymer (P) Wherein X$_-$=I$_-$ 5.07 g of the polymer of Example 1a and 50 g of anhydrous acetonitrile were put in a round bottom flask equipped with mechanical stirrer, dropping funnel, condenser, gas inlet and outlet for nitrogen. A flow of nitrogen (about 2 liter/hours) was applied during the reaction. The flask was heated at 50° C. by means of an external bath and the polymer dispersion was stirred for about 1 hour. 15 g of methyl iodide were then added though the funnel and the mixture was stirred at 50° C. for 12 hours. After cooling at room temperature, the polymer was filtered, washed with 50 ml of acetonitrile for 30 minutes, and then washed three times with 60 ml of methanol for 30 minutes. The polymer was dried at 70° C. under vacuum for 4 hours. 4.93 g of dried polymer are obtained.

The titration iodide content (Method 2) was 0.83 meq/g.

The analytical results confirmed structure (VII) for the polymer, having a concentration of the pendant quaternary ammonium groups of 0.8 meq/g and a calculated molar ratio p/q of 6.6.

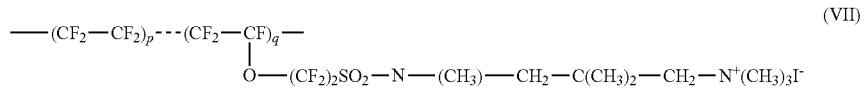

(VII)

Example 1c

Alkylation Reaction with Methyl Tosylate—Preparation of the Fluorinated Anion Exchange Polymer (P) Wherein X$_-$=p-(CH$_3$)C$_6$H$_4$SO$_3-$ Example 1b was repeated using methyl tosylate (7.5 g) as alkylating agent, obtaining 4.7 g of the polymer.

The analytical results confirmed structure (VIII) for the polymer having a concentration of the pendant quaternary ammonium groups of 0.4 meq/g and a calculated molar ratio p/q of 6.5.

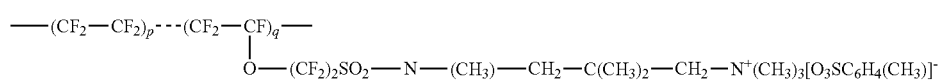

(VIII)

Example 2

Effect of Anion X_ on the Solubility of Polymer (P)

Example 2a

Preparation of Polymers by Anion Exchange Reaction 2 g of the polymer of Example 1b having structure (VII) ($X^-=I^-$) were immersed into 200 ml of hydro-alcoholic solution (1:1 water/ethanol) containing 3 wt % of the sodium salt of the anion $X^-$ under evaluation and stirred for 24 hours. Table 1 lists the anions that were tested. The polymer was then recovered by filtration, washed with distilled water, filtered and dried in oven at 80° C. under vacuum until complete elimination of water.

No residual iodides were detected in the polymer (Method 2) confirming the successful exchange of the anion.

TABLE 1

| Anion (X-) |
|---|
| $Cl^-$ |
| $OH^-$ |
| $NO_3^-$ |
| $CF_3COO^-$ |
| $p\text{-}(CH_3)C_6H_4SO_3^-$ |

Example 2b

Solubility in N,N-dimethylacetamide (DMA) and Casting Tests 0.25 g of each polymer obtained in Example 2a were placed into a vial containing 5 g of DMA and stirred at 80° C. for 4 hours. The vial was centrifuged at 3000 rpm for 15 minutes.

The presence of a clear liquid phase and at most a small amount of gel-like transparent solid at the bottom of the vial was considered as a positive result of the solubility test.

The liquid phase was transferred into a Petri dish having a diameter of 5.5 cm. The dish was placed into an oven and the solvent evaporated under nitrogen flow at 80° C. for 1 hour, providing a transparent membrane of a polymeric material.

The presence of a clear liquid phase and of a solid polymer which remained at the bottom of the vial after centrifugation, was considered as a negative result of the solubility test. As a confirmation the solution was transferred into a Petri dish and the solvent evaporated at 80° C. for 1 hour under nitrogen flow. After complete evaporation of the solvent, no polymer was found at the bottom of the Petri dish.

Results of the tests are reported in Table 2.

TABLE 2

| Anion (X-) | Solubility (5 wt % polymer in DMA) |
|---|---|
| $Cl^-$ | no |
| $I^-$ | yes |
| $OH^-$ | no |
| $NO_3^-$ | yes |
| $CF_3COO^-$ | yes |
| $p\text{-}(CH_3)C_6H_4SO_3^-$ | yes |

Unexpectedly the fluorinated anion exchange polymer (P) is insoluble in aprotic polar organic solvents when $X^-$ is $Cl^-$ or $OH^-$.

On the other hand, liquid compositions comprising 5 wt % of polymer (P) in DMA were obtained when $X^-=I^-$, nitrate, tosylate and trifluoroacetate.

Example 3

Solubility of Polymer (P) Wherein X_=I_ in Solvent Mixtures Comprising Alcohols

Example 3a

N,N-dimethylformamide (DMF) and Isopropanol 0.25 g of the polymer of Example 1b (structure (VII), $X^-=I^-$) were placed into a vial containing 5 g of DMF and 5 g of isopropanol and stirred at 70° C. for 6 hours. The vial was centrifuged at 3000 rpm for 15 minutes. The presence of a clear liquid phase above a solid polymer (which remained in the bottom) after centrifugation, indicated that the polymer is not soluble in the solvent mixture. The liquid phase was transferred into a Petri dish and the solvent evaporated at 90° C. under nitrogen. After complete evaporation of the solvent, no polymer was found at the bottom of the Petri dish, confirming that no or negligible dissolution took place.

Example 3b

DMF and Trifluoroethanol

Comparative Example 1a was repeated using a liquid mixture comprising 5 g DMF and 5 g of trifluoroethanol. No polymer dissolution was observed.

Example 3c

DMA and Isopropanol

A liquid composition comprising 10 wt % of the polymer of Example 1b (structure (VII), $X^-=I^-$) in DMA was prepared. The liquid phase was clear with no gel-like deposit. The liquid composition was divided into three parts and an amount of isopropanol was added to each of the liquid compositions to provide new compositions comprising respectively 15 wt %, 20 wt % and 25 wt % isopropanol with respect to the total weight of the composition. The turbidity of the compositions comprising isopropanol increased to indicate a decrease in the solubility of the polymer however no separation of a solid polymer was observed up to 25 wt % of isopropanol.

Example 4

Stability of Membranes Made of Polymer (P) Under Annealing Conditions at 200° C.

Following the procedure of Example 2b membranes of polymer (P) having different anions $X^-$ were prepared. The anions were selected among those providing a soluble polymer, thus: $I^-$, $NO_3^-$, $CF_3COO^-$, $p\text{-}(CH_3)C_6H_4SO_3^-$.

After drying of the solvent the membrane was treated to a temperature of 200° C. (rate 2° C./min). The resulting transparent membrane at the bottom of the dish was removed by addition of water, dried at 80° C. under vacuum until constant weight and analyzed by FT-IR.

It was observed that when $X^-$ was $I^-$ or trifluoroacetate degradation of the quaternary amino groups in the fluorinated anion exchange polymer (P) took place. The degradation was revealed by the presence of amine bands at 2770 and 2830 $cm^{-1}$ which indicate conversion of the ionic polymer into non-ionic structure (IX).

was wiped with filtering paper and the membrane dried at 80° C. under vacuum until constant weight. The membrane was brittle.

The FT-IR analysis of the dry membrane confirmed that the polymer has an ionic structure (VII).

Example 5b

Liquid Composition of Polymer (VII) and Membrane Preparation by Casting Followed by Annealing at 200° C.

A liquid composition of polymer (VII) was prepared according to the experimental procedure of Example 5a. The casting was performed under nitrogen flow. Drying of the membrane was carried out at 80° C. for 1 hour. It was followed by treatment at 200° C. (rate 2° C./min).

The membrane did not contain any residual iodide (Method 2) and the FT-IR analysis of the dry membrane showed a signal pattern typical of a polymer having structure (IX), indicating degradation of the polymer and loss of ion exchange groups.

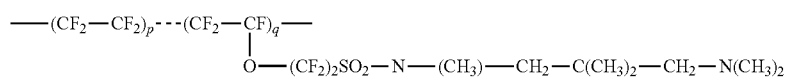

(IX)

On the other hand, when $X^-$ was nitrate or tosylate annealing at 200° C. was possible without degradation of the quaternary ammonium ion exchange groups and formation of non-ionic amine groups. Thus, fluorinated anion exchange polymer (P) wherein $X^-$ was nitrate or tosylate provide an additional advantage over the prior art as they do not only provide a soluble anion exchange polymer (P) but also membranes which can conveniently be annealed to improve their mechanical properties.

Example 5

Preparation and Properties of Annealed and Non-annealed Membranes

Example 5a

Liquid Composition of Polymer (VII) and Membrane Preparation by Casting at Low Temperature 310.5 mg of the polymer of Example 1b ($X^-=I^-$) were placed into a vial containing 3 g of DMA. The mixture was stirred at 80° C. for 2 hours. The slightly opalescent solution thus obtained was centrifuged at 3000 rpm for 15 minutes. A clear liquid phase was obtained, together with a small amount of gel-like transparent solid at the bottom of the vial. The clear liquid phase was then poured into a Petri dish having a diameter of 5.5 cm. The dish was then placed into an oven and the solvent was evaporated at 80° C. under nitrogen flow for 12 hours.

A transparent membrane formed at the bottom of the dish; which was removed by addition of water. The excess water Example 5c Liquid Composition of Polymer (VIII) and Membrane Preparation by Casting Followed by Annealing at 200° C.

502.3 mg of the polymer prepared in Example 1d ($X^-$=tosylate) were placed into a vial containing 5 g of DMA. The mixture was stirred at 80° C. for 2 hours. The solution thus obtained was centrifuged at 3000 rpm for 15 minutes. A clear liquid phase was obtained, together with a small amount of gel-like transparent solid at the bottom of the vial. The clear liquid phase was then poured into a Petri dish having a diameter of 7 cm. Drying of the membrane was carried out at 80° C. for 1 hour under nitrogen flow. It was followed by treatment at 200° C. (rate 2° C./min).

A transparent membrane formed at the bottom of the dish; which was removed by addition of water. The excess water was wiped with filtering paper and the membrane and dried at 80° C. under vacuum until constant weight.

The FT-IR analysis of the dry membrane confirmed structure (VIII) of the polymer, thus with no loss of ion exchange groups.

The membrane after annealing was visibly less brittle.

150 mg of the dry membrane were placed for 24 h in a hydro-alcoholic solution of KOH (KOH 2 g, 1:1 ethanol/water) then washed with water till neutral pH. The film was placed in a NaCl 0.6M solution free from $CO_2$ for 24 h at room temperature (50 g). The potentiometric titration of the solution (Method 3) indicated an amount of hydroxide anions released of 0.74 meq/g.

Example 6

Exchange with Hydroxide Anion and Electrical Conductivity Tests

Example 6a

Exchange of Iodide with Hydroxide Anion

The membrane of Example 5a was immersed into 200 ml of 5 wt % KOH in hydro-alcoholic solution (1:1 water/methanol) and left to stand for 24 hours. The membrane was washed with distilled water free from $CO_2$ until neutrality of the solution dried at 80° C. under nitrogen flow for 24 hours. No residual iodides were detected (Method 2).

A portion of the membrane was immersed into 120 ml of a 0.6 N solution of NaCl free from $CO_2$. After 24 hours at room temperature the solution was titrated according to Method 3. The amount of hydroxide anions released was 0.80 meq/g.

The FT-IR analysis performed on the dry membrane confirmed the presence of the hydroxide anion and the quaternary ammonium group, thus polymer structure (X).

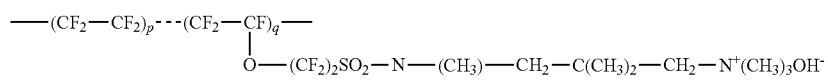

(X)

The electrical conductivity measured on the membrane in the hydroxide form using a Bekktech cell (in-plane 4-electrode conductivity), performed at 100% RH, was 19 mS/cm at 80° C.

Example 6b

Exchange of the Tosylate with the Hydroxide Anion

The same procedure of Example 6a was repeated using the membrane of Example 5c.

The amount of hydroxide anions released was 0.76 meq/g.

The FT-IR analysis performed on the dry membrane confirmed the presence of the hydroxide anion and the quaternary ammonium group, thus structure (X) above.

The electrical conductivity measured on the membrane in the hydroxide form using a Bekktech cell (in-plane 4-electrode conductivity), performed at 100% RH, was 28 mS/cm at 80° C.

The invention claimed is:

1. A liquid composition comprising:
   a liquid medium comprising at least one aprotic polar organic solvent and less than 25 wt % based on the total weight of the liquid composition of an alcohol; and
   at least 5 wt % based on the total weight of the liquid composition of at least one fluorinated anion exchange polymer (P) comprising a fluorocarbon backbone and side-chains covalently attached to the backbone having terminal groups of formula (I): $-SO_2NR^1Q^+X^-$, wherein $Q^+$ is a group comprising at least one quaternary nitrogen atom, and $R^1$ is H or a $C_1$-$C_{20}$ alkyl group, or forms a ring together with a group in $Q^+$, wherein the ring contains 2 to 10 carbon atoms and, optionally, up to 4 heteroatoms; and $X^-$ is an anion selected from the group consisting of organic anions and lipophilic inorganic anions.

2. The liquid composition according to claim 1 wherein $X^-$ is an organic anion selected from the group consisting of $R_{A1}SO_3^-$, wherein $R_{A1}$ is a $C_1$-$C_{20}$ linear or branched, optionally fluorinated, alkyl or substituted or non-substituted aryl group, and of $R_{A2}COO^-$, wherein $R_{A2}$ is a $C_1$-$C_{20}$ linear or branched, optionally fluorinated, alkyl or substituted or non-substituted aryl group.

3. The liquid composition according to claim 1 wherein $X^-$ is a lipophilic inorganic anion selected from the group consisting of $I^-$, $ClO_4^-$, $SCN^-$, and $NO_3^-$.

4. The liquid composition according to claim 1 wherein the aprotic organic solvent is selected from the group consisting of aliphatic and cycloaliphatic amides and aliphatic sulphoxides.

5. The liquid composition according to claim 1 wherein the fluorinated backbone of said fluorinated anion exchange polymer (P) is a linear random polymer chain comprising repeating units represented by the formula (II):

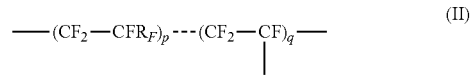

(II)

wherein $R_F$ is F, Cl, $-CF_3$; p is an integer of 0 to 16, q is an integer of 1 to 10 and the ratio of p'/q' is in the range 0.5 to 16 where p' is an average value of all p in the repeating units and q' is an average value of all p in the repeating units.

6. The liquid composition according to claim 5 wherein the fluorinated anion exchange polymer (P) comprises repeating units represented by formula (III):

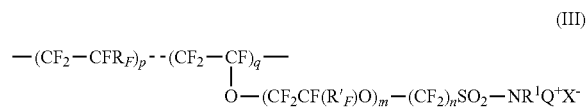

(III)

wherein $R_F$ is selected from the group consisting of F, Cl, and $-CF_3$; $R'_F$ is selected from the group consisting of F, Cl, and $-CF_3$; m is an integer equal to 0 or 1, n is an integer from 0 to 10; $R^1$, $Q^+$ and $X^-$ are as defined in claim 1.

7. The liquid composition according to claim 1 wherein the group of formula (I) has the following structure:

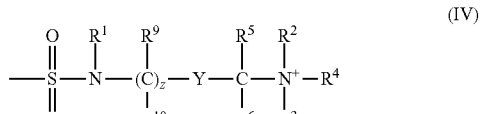

(IV)

wherein Y is a $C_6$-$C_{10}$ aryl group, a heteroaryl group or $CR^7R^8$ wherein $R^7$ is H, a halogen atom or a $C_1$-$C_{20}$ alkyl group or forms a ring together with one of $R^2$, $R^5$, or $R^8$, and $R^8$ is H, a halogen atom or a $C_1$-$C_{20}$ alkyl group or forms a ring together with one of $R^3$, $R^6$, or $R^7$, each of the rings formed by $R^7$ or $R^8$ containing 2 to 10 carbon atoms and optionally 1 to 4 heteroatoms, and the heteroaryl group contains 5 to 10 ring atoms; $R^1$ is H or a $C_1$-$C_{20}$ alkyl group, or forms a ring together with one of $R^2$ or $R^5$, wherein the ring contains 2 to 10 carbon atoms and 1 to 4 heteroatoms; $R^2$ is a $C_1$-$C_{20}$ alkyl group or forms a ring together with one of $R^1$, $R^3$, $R^5$, $R^7$ or $R^9$, wherein the ring contains 2 to 10 carbon atoms and 1 to 4 heteroatoms; $R^3$ is a $C_1$-$C_{20}$ alkyl group or forms a ring together with one of $R^2$, $R^6$, $R^8$ or $R^{10}$, wherein the ring contains 2 to 10 carbon atoms and 1 to 4 heteroatoms; $R^4$ is a $C_1$-$C_{20}$ alkyl group; $R^5$ is H, a halogen atom or a $C_1$-$C_{20}$ alkyl group, or forms a ring together with one of $R^1$, $R^2$, $R^7$ or $R^9$, wherein the ring contains 2 to 10 carbon atoms and optionally 1 to 4 heteroatoms; $R^6$ is H, a halogen atom or a $C_1$-$C_{20}$ alkyl group, or forms a ring together with one of $R^3$, $R^8$ or $R^{10}$, wherein the ring contains 2 to 10 carbon atoms and optionally 1 to 4 heteroatoms; each $R^9$ is independently H, a halogen atom or a $C_1$-$C_{20}$ alkyl group, or forms a ring together with one of $R^2$ or $R^5$, wherein the ring contains 2 to 10 carbon atoms and optionally 1 to 4 heteroatoms; each $R^{10}$ is independently H, a halogen atom or a $C_1$-$C_{20}$ alkyl group, or forms a ring together with one of $R^3$ or $R^6$, wherein the ring contains 2 to 10 carbon atoms and optionally 1 to 4 heteroatoms; z is an integer from 0 to 4; and wherein the ring structures in the group of formula (II) can be bridged by $C_1$-$C_4$ alkylene groups.

8. The liquid composition according to claim 7 wherein $R^1$=H, $R^2$=$R^3$=$CH_3$, $R^5$=$R^6$=$R^9$=$R^{10}$=H, z=1 and Y=$CR^8R^9$, wherein $R^8$=$R^9$=$CH_3$.

9. The liquid composition according to claim 1 further comprising catalyst particles.

10. A process for preparing the liquid composition of claim 1, said process comprising the step of dissolving at least one fluorinated anion exchange polymer (P) comprising a fluorocarbon backbone and side-chains covalently attached to the backbone having terminal groups of formula (I): —$SO_2NR^1Q^+X^-$ in a liquid medium comprising at least one aprotic polar organic solvent and less than 25 wt % based on the total weight of the liquid composition of an alcohol, wherein $R^1$, $Q^+$ and $X^-$ are as defined in claim 1.

* * * * *